United States Patent
Ponceau

(10) Patent No.: US 6,616,222 B1
(45) Date of Patent: Sep. 9, 2003

(54) ASSIST GRIP FOR THE INTERIOR OF A VEHICLE AND METHOD FOR MOUNTING THE SAME

(75) Inventor: Philippe Ponceau, Le Perray en Yvelines (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 10/148,209
(22) PCT Filed: Dec. 10, 1999
(86) PCT No.: PCT/FR99/03093
§ 371 (c)(1), (2), (4) Date: Jun. 10, 2002
(87) PCT Pub. No.: WO01/42041
PCT Pub. Date: Jun. 14, 2001

(51) Int. Cl.$^7$ ................................. B60N 3/20
(52) U.S. Cl. ................ 296/214; 16/445; 280/730.2
(58) Field of Search ............... 296/214, 39.1, 296/97.9; 280/730.2; 16/404, 408, 444, 445

(56) References Cited

U.S. PATENT DOCUMENTS

| 2,282,412 | A | * | 5/1942 | Wallace ....................... 16/436 |
| 4,637,765 | A | * | 1/1987 | Omata ........................ 411/41 |
| 4,981,322 | A | * | 1/1991 | Dowd et al. ................. 296/214 |
| 4,981,323 | A | * | 1/1991 | Dowd et al. ................. 296/214 |
| 5,358,299 | A | * | 10/1994 | Seto .......................... 296/97.9 |
| 5,403,064 | A | * | 4/1995 | Mahler et al. ............... 296/214 |
| 5,507,545 | A | * | 4/1996 | Krysiak ..................... 296/97.9 |
| 5,560,575 | A | * | 10/1996 | Krysiak .................... 248/222.12 |
| 5,791,683 | A | * | 8/1998 | Shibata et al. ............ 280/730.2 |
| 5,920,957 | A | | 7/1999 | Wagner |
| 6,079,735 | A | * | 6/2000 | Fallmann et al. .......... 280/730.2 |
| 6,102,435 | A | * | 8/2000 | Wallner et al. ........... 280/730.2 |
| 6,152,485 | A | * | 11/2000 | Kato ........................... 280/749 |
| 6,173,990 | B1 | * | 1/2001 | Nakajima et al. ......... 280/730.2 |
| 6,237,941 | B1 | * | 5/2001 | Bailey et al. ............. 280/730.2 |
| 6,322,126 | B1 | * | 11/2001 | Kraus ........................ 296/97.9 |
| 6,409,210 | B1 | * | 6/2002 | Emerling ................. 280/730.2 |
| 6,428,089 | B1 | * | 8/2002 | Noda ......................... 296/214 |
| 6,435,544 | B1 | * | 8/2002 | Brucker ................... 280/730.2 |
| 6,477,739 | B2 | * | 11/2002 | Miho et al. ................. 16/429 |
| 2001/0045729 | A1 | * | 11/2001 | Mueller ................... 280/730.2 |
| 2001/0052693 | A1 | * | 12/2001 | Mueller ................... 280/730.2 |
| 2002/0047293 | A1 | * | 4/2002 | Noda ......................... 296/214 |
| 2002/0130494 | A1 | * | 9/2002 | Blake et al. ............. 280/730.2 |

FOREIGN PATENT DOCUMENTS

| DE | 44 04 972 | 6/1995 |
| EP | 0 346 156 | 12/1989 |
| EP | 0 685 359 | 12/1995 |
| FR | 2 764 010 | 12/1998 |
| GB | 2 055 421 | 3/1981 |
| WO | 96 17178 | 6/1996 |

* cited by examiner

Primary Examiner—D. Glenn Dayoan
Assistant Examiner—Patricia Engle
(74) Attorney, Agent, or Firm—Oblon, Spivak, McClelland, Maier & Neustadt, P.C.

(57) ABSTRACT

A hinged handle, such as a breaker bar for an interior of an automobile vehicle. The hinged handle includes an arch hinged on at least one mechanism configured to fasten the arch on a support. The fastening mechanism includes an expandable pin and a stud engaged in the pin and that is movable between a first position in which the stud is idle and a second position in which the stud causes the pin to expand. The arch of the handle can be pivoted to strike the stud, causing the stud to move from the first position to the second position.

15 Claims, 2 Drawing Sheets

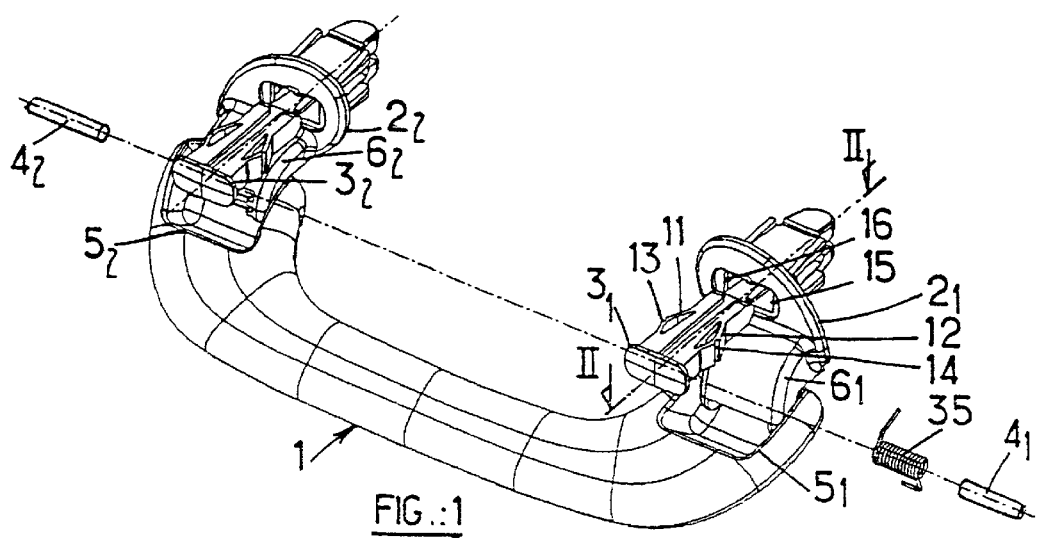
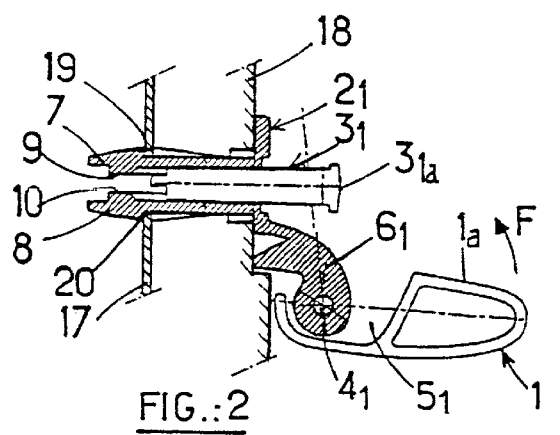
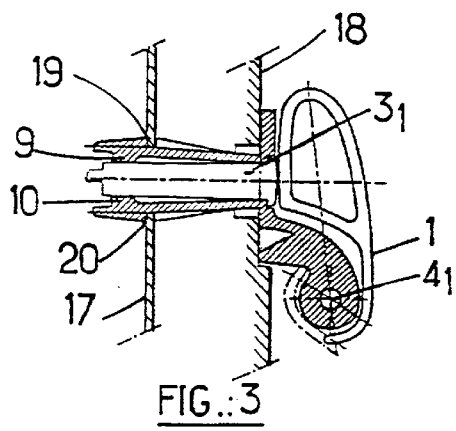
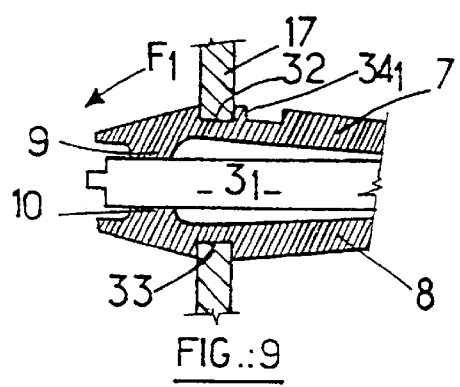

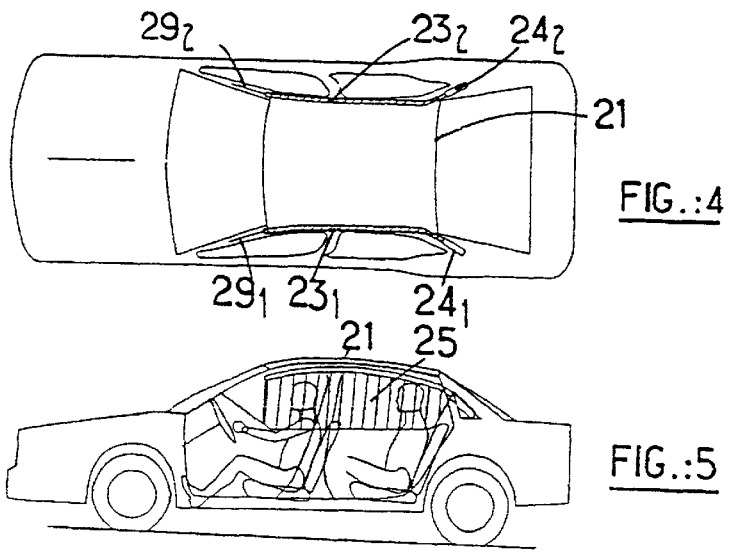
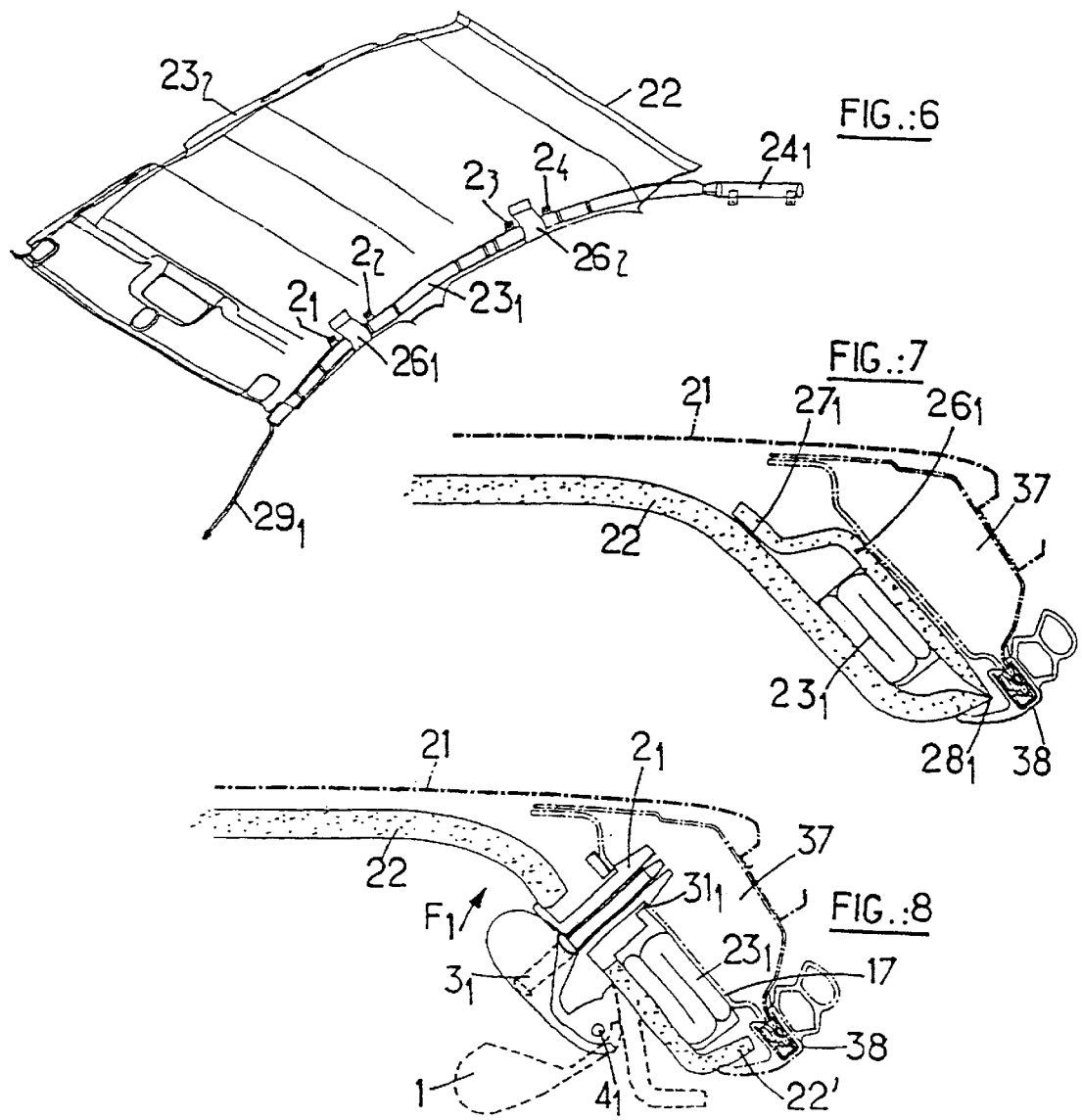

ASSIST GRIP FOR THE INTERIOR OF A VEHICLE AND METHOD FOR MOUNTING THE SAME

This invention concerns a hinged handle, notably for a passenger compartment of a motor vehicle, and a method of mounting that handle.

Such handles are commonly found in passenger compartments of motor vehicles, at the top of the compartments, in order to enable the passengers to keep their balance when the vehicle undergoes pitching, rolling or winding movements as, for example, when the vehicle is traveling in a series of turns.

Those handles must therefore be very solidly fastened to the roof of the passenger compartment. The placement and fastening of those handles require manual or robotic operations which take place in a confined space, that of the passenger compartment. They are therefore inconvenient and, consequently, expensive. A need thus exists to rationalize those operations in order to lower the cost thereof.

This invention is specifically intended to provide a hinged handle having a structure designed to simplify the operations necessary for mounting it in the passenger compartment of a motor vehicle.

This invention is also intended to provide a method of mounting that handle which makes it possible to advantageously combine in the passenger compartment the mounting of the handle, of a roof liner and of inflatable bags (commonly called "airbags") to protect the passengers in case of collisions.

Those objects of the invention, as well as others that will be apparent on reading the description which follows, are accomplished with a hinged handle, notably for motor vehicle passenger compartments, comprising an arch hinged on at least one means of fastening said arch on a support, that handle being noteworthy in that said means of fastening consists of an expandable pin and a stud engaged in said pin and movable between a first position in which it is idle and a second position in which it causes the stud to expand, the arch of said handle being arranged so that it can be pivoted to strike said stud, causing it to move from its first position to its second position.

As will be seen below, the use of the handle as a striker, on fastening of the latter, makes it possible to simplify the operations or tools necessary for mounting the handle. Furthermore, the use of expandable pins to fasten the handle gives the latter an exceptionally high tear resistance, contributing to passenger safety.

According to other characteristics of the handle of this invention, it comprises two means of fastening, each hinged to one of the two ends of the arch, said fastenings comprising means making it possible to retain the studs temporarily in their first position.

According to the invention, in order to mount this handle on a support, each fastening is engaged in a hole of the support, the stud being mounted in its first position on the pin of said member, and the arch of the handle is pivoted on the head of the stud to make it pass by impact to its second position, in which it produces the expansion and locking of the pin in said hole.

When this method is applied to a support forming part of the passenger compartment of a motor vehicle containing a ceiling designed to be covered with a roof liner, on the outside of the passenger compartment, several handles are mounted on said liner by engaging the pins of those handles in openings of the liner, the assembly thus formed is introduced in the passenger compartment by engaging the pins in holes in the passenger compartment provided to receive them, and the handles are pivoted to control by impact the expansion and locking of the pins in said holes.

The invention thus enables a motor vehicle body ceiling to be made with a liner fastened in proximity to the interior face of the roof of the vehicle by means of said handles. The ceiling can further contain at least one airbag installed between the liner and the roof next to the side edge of the liner, said airbag being fastened to said liner by at least one brittle lug.

Other characteristics and advantages of this invention will be apparent on reading the description which follows and examining the attached drawing in which:

FIG. 1 is a view in perspective of the handle according to the invention,

FIGS. 2 and 3 are cutaway views of the handle of FIG. 1, explaining the method of mounting that handle according to this invention, FIGS. 4 and 5, are schematic plan and side elevation view respectively of a motor vehicle equipped with side airbags mounted according to the method of the invention, FIG. 6 is a view in perspective of the roof liner of the vehicle of FIGS. 4 and 5, illustrating one phase of this method, FIGS. 7 and 8 are detailed cutaway views of fastening means used in the method according to the invention, and FIG. 9 is a detailed view of one particular embodiment of a pin forming part of the handle according to the invention.

The pins $2_1$, $2_2$ are of "expandable" type, expansion of the pins being produced by forcing "studs" $3_1$, $3_2$ respectively into a channel inside the pin. The pins and the studs designed for use of this invention have specific characteristics, as will be seen below, which appreciably depart from the simpler elements commonly designated by those names.

In the first place, the pins $2_1$, $2_2$ comprise means of hinging on the arch 1, those means consisting of spindles $4_1$, $4_2$ respectively mounted in recesses $5_1$, $5_2$ of the ends of the arch 1 and respectively crossing lateral extensions $6_1$, $6_2$ of those pins. Extension $6_1$ of pin $2_1$ and recess $5_1$ of the arch 1 are more visible on the section of FIG. 2, taken along section line II of FIG. 1. In FIG. 2 it appears that pin $2_1$, for example, comprises two generally parallel lugs 7, 8 delimiting a channel between them in which stud $3_1$ can pass. That stud is represented on FIG. 2 in a first position or ready position apart from two bearings 9, 10 formed on the free ends of lugs 7, 8 respectively and projecting inside the pin.

The studs $3_1$, $3_2$ contain means making it possible for that ready position to be defined. Those means consist of two elastic bridges referenced 11, 12 on stud $3_1$ of FIG. 1, arranged symmetrically and laterally on the stud, those bridges bearing a groove 13, 14 respectively in the middle, arranged to be elastically locked on a rib 15, 16 respectively formed at the entrance of the corresponding pin. The cooperation of those grooves and ribs then precisely defines the axial position of stud $3_1$ in the ready position represented on FIG. 2, where it must be temporarily retained, as will be seen below.

In order to mount the handle of FIG. 1 on a support consisting, as represented on FIGS. 2 and 3, for example, of a sheet 17 and a bearing surface 18 bored with holes allowing passage of the lugs 7, 8 of the pins $2_1$, $2_2$ by means of a slight bending of the latter toward the inside of the pin, the pins $2_1$, $2_2$ are forcibly engaged through those holes, while the studs $3_1$, $3_2$ remain in the ready position represented on FIG. 2.

In FIG. 2 it can be observed that the free ends of the lugs 7, 8 present outer facets symmetrically inclined toward the inside of pin $2_1$, in order to facilitate passage into the holes of the support, those facets being delimited by notches 19, 20 arranged axially so that they can be hooked on the edge of the hole bored in the sheet 17.

FIG. 2 also shows other essential characteristics of this invention, namely that the arch 1 is shaped so as to present a surface element 1a placed at a distance from the axis $4_1$ of rotation of that arch appreciably equal to the distance separating that axis from the head $3_{1a}$ of stud $3_1$ in Its ready position.

Thus, by imparting to the arch 1, from the position represented on FIG. 2, a rotation in the direction of arrow F, it is understood that the surface element 1a of that arch will come to bear on the head $3_{1a}$ of stud $3_1$. By then imparting to the arch 1 an adequate active force, that arch strikes stud $3_1$ with sufficient energy to make the latter pass from its ready position to a second position, represented on FIG. 3, where its end passes between the bearings 9 and 10 of lugs 7, 8 respectively, in order to push them outward. That "expansion" of pin $2_1$ engages the notches 19, 20 with the edge of the hole bored in the sheet 17. That pin resting, moreover, on the bearing surface 18, it is positively and firmly locked on the support (17, 18), thus ensuring fastening on the latter of the arch with which it is integrated by means of the spindle $4_1$ and its lateral extension $6_1$.

It is understood that the integration, in the handle according to the invention, of means cooperating in development of the striking force necessary to mount the handle on its support considerably simplifies the operations of mounting that handle, whether they are then performed manually or by robots. This is very favorable for lowering the cost of those operations.

Tests have shown, furthermore, that such an expandable pin fastening makes it possible to give the arch a tear resistance of approximately 160 daN, much higher than that obtained by means of a standard screw fastening, which is favorable to passenger safety, when such a handle is mounted in the passenger compartment of a motor vehicle.

Use of the handle according to this invention makes it possible, in such a vehicle, to simplify the operations of mounting a roof liner on the ceiling of the passenger compartment, whether that mounting is combined or not with that of airbags commonly mounted at present in motor vehicles according to different procedures, including that described in EP 791 511.

That document presents a motor vehicle with a roof liner and, fastened between the respective side edges of that liner and the roof, folded inflatable bags, commonly called "airbags," combined with gas generators which inflate them in case of collisions, so that they will be deployed outside their storage space and will then protect the passengers of the vehicle, notably in case of lateral collisions. In order to install the equipment described in this document, it is advisable first to fasten on the roof the airbags and the associated gas generators and then the roof liner covering them. Those operations are inconvenient, even for robots, for they must be carried out inside the narrow space of the passenger compartment of the vehicle.

This invention is specifically intended also to provide a method of mounting side airbags for passengers of a motor vehicle, use of which will be easier than that described above and which will therefore make it possible to lower the cost of that operation.

This method according to the invention is going to be described by referring to FIGS. 4 to 9 of the attached drawing, in which it appears that the vehicle represented has a body ceiling consisting of a roof 21 with a standard liner 22, as more clearly shown on the cross sections of the ceiling presented on FIGS. 7 and 8.

The liner 22 can be made of a heat and/or sound insulating material, such as a felt or plastic foam and assumes a generally rectangular shape, slightly arched in order to follow the curvatures of the roof, as represented on FIG. 6.

As represented on FIGS. 4 and 6, the vehicle is equipped with at least one and preferably at least two airbags $23_1$, $23_2$ that are accordion-folded, for example (see FIG. 6), so as to assume an elongated outer shape, those bags each being mounted in proximity to one of the side edges of the liner 22.

Each of the bags $23_1$, $23_2$ can be selectively inflated by a gas generator $24_1$, $24_2$, respectively, connected at the end of the bag, as represented on FIG. 6, and activated by a collision sustained by the vehicle. The airbags are then deployed in the passenger compartment of the vehicle along its side walls in spaces such as that hatched and referenced 25 on FIG. 5, so as to protect, notably, the heads of passengers against impacts on the side windows or uprights of the passenger compartment of the vehicle. Those devices are well known to the individual skilled in the trade and therefore are not described here in greater detail.

According to this invention, the airbags $23_1$, $23_2$ and the roof liner are mounted in the passenger compartment of the vehicle in two stages. In a first stage the bags $23_1$, $23_2$ are mounted on the liner, while the latter is outside the vehicle, which makes that operation convenient.

In order to fasten bag $23_1$, for example, on the liner 22, it is placed over a side edge of that liner and there is pressed down on same, above the elongated bag $23_1$, at least one and preferably two brittle fastening lugs $26_1$, $26_2$ (see FIG. 6), the ends of which are stuck on the liner, for example, by means of a piece of double-faced adhesive, such as that referenced $27_1$ on the cross section of FIG. 7, taken at lug $26_1$.

According to one advantageous embodiment of this invention, the lugs $26_1$, $26_2$ can initially project from the liner and be made of the same material, the lugs being connected to the liner by a brittle fold line, for a purpose that will be explained below.

The liner 22 is then equipped with airbags $23_1$, $23_2$, two gas generators $24_1$, $24_2$ respectively combined, and two binders $29_1$, $29_2$, each respectively fastened to the end of the combined bag which is opposite the one receiving the gas generator (see FIGS. 4 and 6).

According to the invention, two "top" handles according to the invention are then mounted on the liner, for example, at the level of the lugs $26_1$, $26_2$, as far as bag $23_1$ is concerned (see FIG. 6), so that the pins $2_1$, $2_2$ and $2_3$, $2_4$ of those handles cross corresponding holes bored in the liner in order to be temporarily retained by that liner.

The integrated assembly thus constituted can then be carried in one piece in order to be introduced in the passenger compartment of the vehicle and fastened on the roof 21 of that vehicle, as represented on FIGS. 7 and 8, in a second stage of the method according to this invention.

In order to do so, the liner thus equipped in the passenger compartment of the vehicle is installed manually or by means of a robot, so that the pins $2_i$ are each matched with a hole $31_i$, as is the case with the pin $3_1$ and the hole $31_i$ represented on FIG. 8, which is a partial cross section of the liner 22 taken at the level of pin $2_i$. The holes $31_i$ can be bored in a hollow side beam 37 integral with the roof 21 and serving with the liner 22 as the support 17, 18 of FIGS. 2 and 3.

As represented on FIG. 8, each pin retains a stud, such as stud $3_1$.

On presentation of the liner in the passenger compartment, the stud $3_1$ is in its ready position represented by a broken line and the end of the pin then has a diameter which enables it to be passed into the hole $31_1$. Once the ends of the pins $2_i$ are passed into the corresponding holes, the studs are struck with the arches of the handles either manually or by means of a robot, the studs passing into the position represented by the solid line on FIG. 8. The end of the associated pin is then expanded by the stud and is locked in the latter, as described in connection with FIGS. 2 and 3.

The liner, the airbags and the top handles are thus instantly installed in their final position in the vehicle. All that remains is to fasten the gas generators $24_1$, $24_2$ and the binders $29_1$, $29_2$ on corresponding uprights of the passenger compartment of the vehicle.

It now is understood that the method of mounting described above is particularly rapid and therefore economical, in accordance with the purposes indicated. It will be noted, in particular, that this method eliminates inconvenient operations, for it was previously necessary to fasten the airbags inside the passenger compartment before placement of the roof liner. It also will be noted that the fastening pins of the top handles likewise economically ensure fastening of the bags and liner in the passenger compartment.

When a collision triggers the inflation of one or more of the bags $23_i$, it is obviously necessary for them to be able to come out of their housing and be deployed in the passenger compartment. In order to do so, it is necessary for the fastening lugs $26_i$ maintaining the bags on the liner to be brittle, that is, to be capable of being torn away to permit expansion of the bags under the pressure of the gas filling them after the collision. That brittleness is obtained by virtue of the line of weakness constituting the fold line $28_1$ (see FIG. 7).

It is also advisable to make the liner 22 of a flexible material, so that its edge 22' can be deformed by slipping out to a weather stripping 38 profiled to retain it and can come into the position represented by the broken line on FIG. 8, under the thrust of the bag $23_1$ being inflated. An opening is thus cleared, in which the bag is engulfed in order to be deployed in the passenger compartment and fulfill its protective function there.

It appears on FIG. 8 that the airbag $23_1$ is supported across the liner on the handle according to the invention. Deployment of the bag $23_1$, may then require a degree of pivoting of the handle in the direction of arrow $F_1$ in order to prevent the dangerous projection of same toward the passengers under the thrust of the bag being inflated.

According to this invention, that pivoting is ensured by arranging on the lugs 7, 8 of the pins notches 32, 33 (see FIG. 9) for hooking the ends of those pins on the sheet 17 of the beam 37, one (32) of the notches being delimited on one side by two transversely spaced brittle fingers $34_1$, $34_2$.

Under the stress (on the order of 800 daN) developed by the airbag on the handle upon its deployment, the fingers $34_1$, $34_2$ are broken and the pins then pivot around the notch 33 in the direction of arrow $F_1$, without the handle being detached from the beam 37, the pivoting of pin $2_1$, for example, ensuring its wedging into the hole $31_1$. The rupture of fingers $34_1$ and $34_2$ also makes it possible to absorb a portion of the kinetic energy of the liner pushed by the airbag.

The invention is, of course, not limited to the embodiments described and represented, which have been given only by way of example. Thus, a return spring 35 (see FIG. 1) can keep the arch 1 of the handle in the retracted position represented by the solid line on FIG. 8, when the latter is not used. Thus, the handle according to the invention could also be used for mounting a roof liner not equipped with airbags. Still more generally, the handle according to the invention can serve to equip any object, such as luggage, furniture, drawer, etc., capable of being equipped with a hinged handle.

What is claimed is:

1. Hinged handle, comprising:
   an arch hinged on at least one mechanism configured to fasten said arch on a support, wherein said mechanism configured to fasten includes an expandable pin and a stud engaged in said pin and movable between a first position in which the stud is idle and a second position in which the stud causes the pin to expand, wherein said mechanism configured to fasten comprises at least one elastic bridge formed on the stud for retaining the stud temporarily in the first position, the arch of said handle configured to be pivoted to strike said stud, causing the stud to move from the first position to the second position.

2. Handle according to claim 1, comprising two mechanisms configured to fasten, each hinged to one of two ends of the arch, said two mechanisms configured to fasten comprising means including at least one elastic bridge formed on the studs for retaining the studs temporarily in the first position.

3. Handle according to claim 2, wherein said means for retaining further includes one rib, and one groove complementing one another, one of the one rib and groove is formed on said bridge and the other of the one rib and groove is formed on said pin, engagement of the groove in the rib defining the first position of the stud.

4. Handle according to claim 2, further comprising a return spring mounted on the hinge of at least one of said two mechanisms configured to fasten to load the arch elastically toward the second position.

5. Hinged handle according to claim 1, wherein each mechanism configured to fasten is engaged in a hole of the support, the stud being mounted in the first position on the pin, and wherein the arch of the handle is pivoted on a head of the stud to make the stud pass by impact to the second position, in which the stud produces expansion and locking of the pin in said hole.

6. Hinged handle according to claim 1, applied to a support forming part of a passenger compartment of a motor vehicle containing a ceiling configured to be covered with a roof liner, wherein, on an outside of the passenger compartment plural handles are mounted on said liner by engaging the pins of those handles in openings of the liner, an assembly thus formed is introduced in the passenger compartment by engaging the pins in holes in the passenger compartment provided to receive the pin, and the handles are pivoted to control by impact expansion and locking of the pins in said holes.

7. Hinged handle according to claim 6, wherein, prior to introduction of the roof liner in the passenger compartment, at least one airbag is fastened along at least one of side edges of a face of said liner which is to come opposite the roof.

8. Motor vehicle body ceiling comprising a liner fastened in proximity to an interior face of a roof of the vehicle and means for fastening the liner on said roof, wherein said means for fastening includes at least one fastening of at least one handle according to claim 1.

9. Body ceiling according to claim 8, wherein at least one airbag is installed between said liner and said roof next to a side edge of the liner.

10. Body ceiling according to claim 9, wherein said at least one airbag is fastened on said liner by at least one brittle lug.

11. Body ceiling according to claim 10, wherein said at least one brittle lug is formed in one piece with said liner and laterally projects from said liner beyond a brittle fold line.

12. Body ceiling according to claim 11, wherein said at least one brittle lug is pressed down on said bag and fastened by its end on a face of the liner which is opposite the roof.

13. Body ceiling according to claim 9, wherein said at least one airbag is folded in an elongated shape and fastened between the roof and a side edge of the liner, the liner being deformable at a level to permit expansion of the air bag out of a space in which the airbag is folded, when the airbag is inflated under action of a gas generator activated by a collision.

14. Body ceiling according to claim 13, wherein the at least one handle fasting the liner equipped with the at least one airbag is placed in proximity to said bags, and wherein said at least one handle is equipped with means to be pivoted upon deployment of the bags, without being detached from the support.

15. Hinged handle, comprising:

an arch hinged on at least one mechanism configured to fasten said arch on a support, wherein said mechanism configured to fasten includes an expandable pin and a stud engaged in said pin and movable between a first position in which the stud is idle and a second position in which the stud causes the pin to expand, the arch of said handle configured to be pivoted to strike said stud, causing the stud to move from the first position to the second position, wherein the pin includes a brittle member that engages the support when the stud is in the second position, and wherein the brittle member is configured to be broken under a predetermined stress whereby said hinged handle is allowed to pivot with respect to the support.

* * * * *